United States Patent [19]

Rearden et al.

[11] Patent Number: 5,368,092
[45] Date of Patent: Nov. 29, 1994

[54] APPARATUS AND METHOD FOR CONTROLLING TEMPERATURE OF A TURF FIELD

[75] Inventors: Jim K. Rearden; Michael Muchow, both of Sonoma, Calif.

[73] Assignee: Biotherm Hydronic, Inc., Cotati, Calif.

[21] Appl. No.: 172,699

[22] Filed: Dec. 27, 1993

[51] Int. Cl.$^5$ .............................................. F28D 17/00
[52] U.S. Cl. ................................... 165/45; 405/131; 47/DIG. 10
[58] Field of Search ............... 165/45, 46; 405/131; 47/2, 17, 18, 19, 29, 1.42, DIG. 10; 126/665

[56] References Cited

U.S. PATENT DOCUMENTS

| | | | |
|---|---|---|---|
| 4,309,843 | 1/1982 | Kato | 47/18 |
| 4,566,527 | 1/1986 | Pell et al. | 165/1 |
| 4,577,435 | 3/1986 | Springer et al. | 47/2 |
| 4,880,051 | 11/1989 | Ohashi | 165/45 |
| 5,097,893 | 3/1992 | Trimble | 165/46 |
| 5,120,158 | 6/1992 | Husu | 405/43 |
| 5,178,485 | 1/1993 | Katsuragi et al. | 404/95 |

OTHER PUBLICATIONS

Pollard, Turning Up the Heat at Pebble Beach Golf Links, Jun. 1991.
Miller, Touching up the Mona Lisa, Jan./Feb. 1992.

*Primary Examiner*—John C. Fox
*Attorney, Agent, or Firm*—Keck, Mahin & Cate

[57] ABSTRACT

A subsurface hydronic heat-exchanging apparatus and method are provided for controlling the temperature of a turf field. A temperature-controlling fluid is circulated from a temperature-controlled fluid source through a supply header laterally disposed to the field and coupled to an array of hollow tubular heat-exchanging elements underlying the field. Fluid is recirculated to the fluid source from the tubes through a return header laterally disposed to the field and coupled to the tubes. Temperature sensors are disposed adjacent the turf field which detect the temperature of the field and a temperature control device is provided which is responsive to the detected temperature.

15 Claims, 2 Drawing Sheets

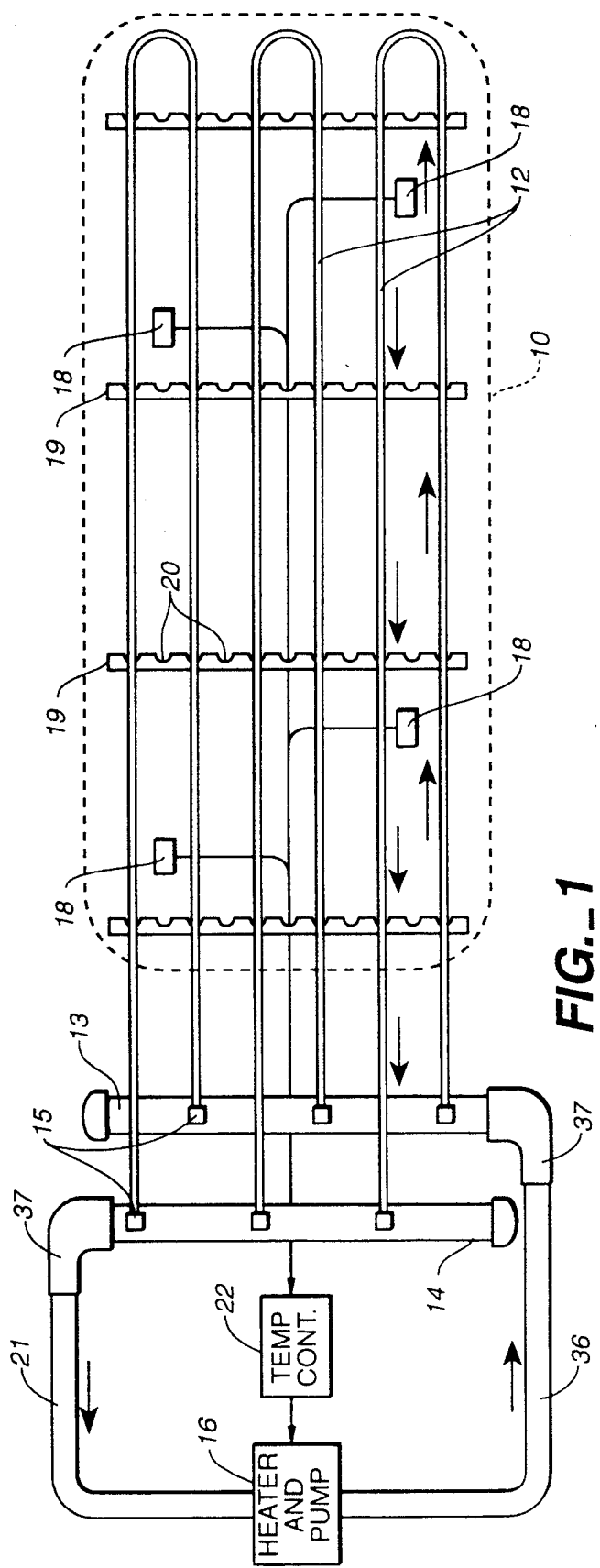
FIG._1
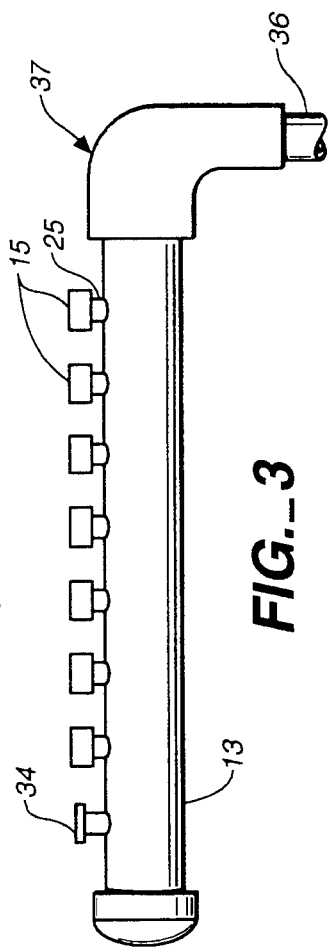
FIG._3

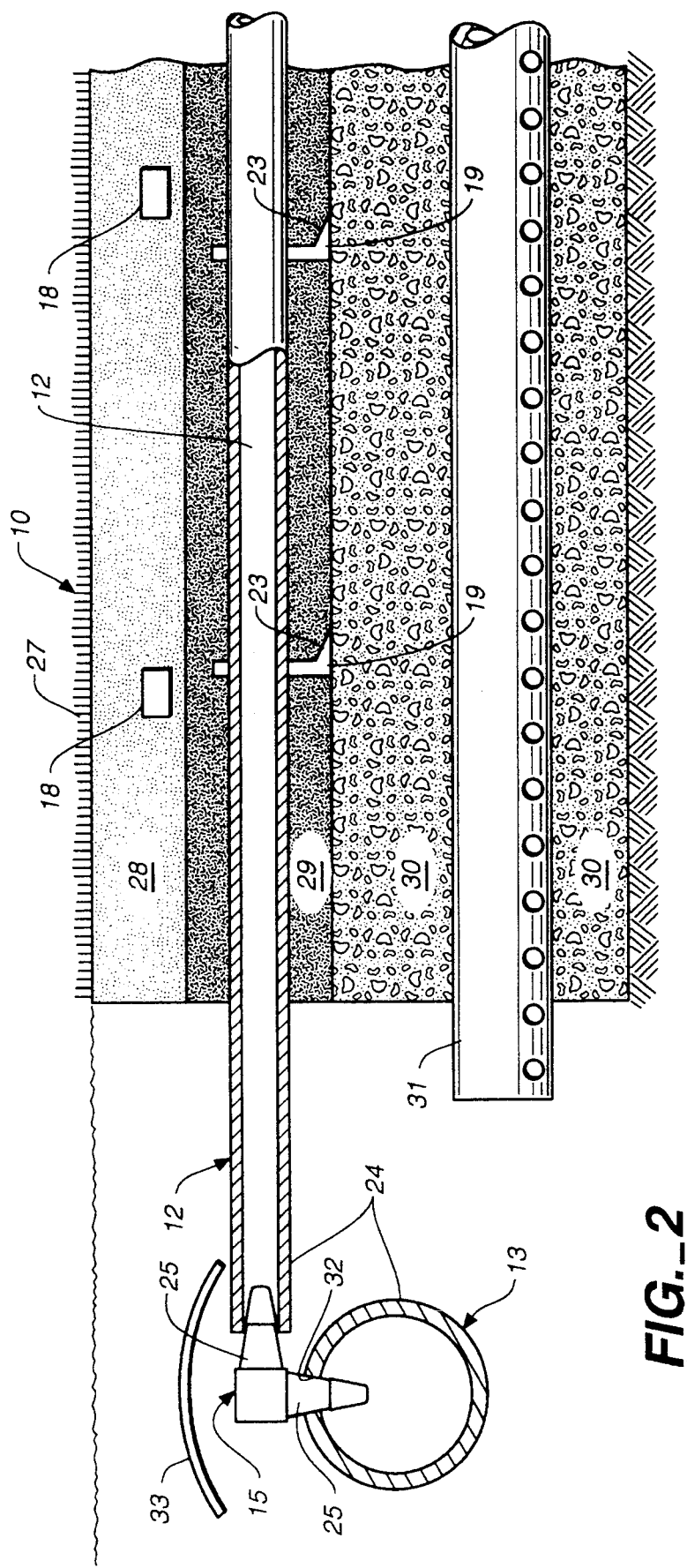
FIG._2

APPARATUS AND METHOD FOR CONTROLLING TEMPERATURE OF A TURF FIELD

BACKGROUND AND SUMMARY OF THE INVENTION

The present invention relates to a method and apparatus for controlling the sub-surface temperature of a grass field which is subjected to less than optimal growing conditions. The method and apparatus have application, for example, in dramatically improving the growing conditions of golfing greens which are subject to shading from sunlight and temperature extremes which are harmful to grass surfaces.

It is well known in the prior art pertaining generally to plant growing that such growth is largely dependent on such factors as the extent to which a plant is exposed to sunlight and the temperature to which the root system is exposed.

Regarding temperature, it is well known that plant growth can be facilitated by maintaining plant growing temperatures within an optimal range. Systems for controlling the ambient temperature of plants have primarily been directed to the use of enclosures, such as greenhouses, in which the overall ambient air temperature is controlled, usually by varying radiant heat from solar or artificial sources, use of heat pipes in contact with the air, or air heat pumps or air conditioners, or various combinations of such methods.

Due to the substantial cost of energy required to control ambient temperature, energy efficiency in connection with the growing of plants has become a significant consideration. It is now widely recognized in the industry that one of the most efficient ways of growing plants is to create a micro-climate for the plants, through heating of the root zones of the plants, rather than by attempting to control the air temperature around the plants. In some installations it has been even found most advantageous to heat the plant root zone while cooling the foliage. Therefore, considerable effort has been expended in developing water-based heating systems which are installed underneath plant containers or in propagation benches or beds in combination with space heating or cooling apparatus. Such root heating or micro-climate temperature control systems have been found to achieve substantial energy savings as compared to conventional space heating systems. Unfortunately, such heating systems have also been accompanied by a significant increase in the system maintenance costs.

A patent disclosing such a system is U.S. Pat. No. 4,557,435 to Springer at al. This patent discloses a micro-climate temperature control apparatus wherein an array of heat-exchanging plastic tubes are disposed adjacent a plurality of plants in individual growing containers. Each plastic tube is connected to an inlet and outlet manifold which in turn are connected to a source of heated water.

U.S. Pat. No. 4,309,843 to Kato discloses a plant cultivation device using hot water pipes covered by a layer of wood chips and a second layer of soil. The heating pipes are enclosed in a complex structure including concrete blocks, slate-corrugated plates, partition wall plates and a shielding cover. Maintenance of such a system poses significant problems due to the inability to access manifolds in the event of leakage which can lead to destruction of root systems.

U.S. Pat. No. 5,120,158 to Husu discloses an apparatus for thawing a frozen grass playing field wherein an array of perforated pipes are arranged in a filter layer beneath the playing field. The perforated pipes are connected to blowers which circulate heated air through the pipes in order to thaw the frozen field and remove moisture therefrom.

Although such a system may be appropriate for raising the temperature of a field above the freezing point, and thereby thawing the field, temperature gradients which exist in a volume of air significantly limit the utility of such a system to control temperatures of plants in contact with such air. Further, such convective methods require considerably more time than a conductive heat transfer method to bring the overall temperature of a growing system to steady state conditions or to correct variations which occur due to factors outside the enclosed growing environment. Moreover, the heating and cooling of large volumes of air is generally less efficient and more costly as a heat transfer method than controlling a confined and smaller volume of water or other liquid exhibiting a greater heat conductivity than air.

Subsurface hydronic heating systems have been installed in golfing greens to control the green temperature and promote growth. However, significant drawbacks are associated with prior art systems which limit their overall utility. For example, such systems generally entail installation of a subsurface header assembly within the green area, thereby requiring major excavation of the green in the event of leakage at the headers or for completion of maintenance procedures. Also, prior art designs necessitate the use of excessive lengths of subsurface tubing which may result in uneven heat transfer and uneven heating of the green. Moreover, temperature sensor and control systems responsive to localized temperature fluctuations frequently result in the over heating or over cooling of regions of the green not subject to the localized temperature fluctuation, thereby resulting in less than optimum control of the temperature of the turf field and in a waste of energy.

Accordingly, one object of the present invention is the provision of an apparatus and method for maintaining the temperature of a grass field within a specified range, thereby promoting optimum growth of the field. Another object of the present invention is the provision of an apparatus and method for controlling the temperature of a turf field which permits maintenance and repair of a subsurface header assembly to be conducted in a simple and convenient manner without destructive excavation of the grass field. A further objective of the present invention is the provision of an apparatus and method which permits even heating throughout the grass field. An even further objective of the present invention is the provision of a turf heating apparatus and method which is leakage resistant and significantly more energy efficient than prior art devices and methods.

These and other objects of the present invention are attained by the provision of subsurface hydronic heat-exchanging apparatus and method wherein a temperature-controlling fluid is circulated from a temperature-controlled fluid source through a supply header to an array of hollow tubular heat-exchanging elements and back through a return header to the source. The headers are connected to the heat-exchanging elements through tubular extensions which permit placement of the header at a position outside the turf field, thereby permitting access to the subsurface headers without destructive excavation of the field. Temperature sensor means are disposed adjacent the turf field which detect the temperature of the field and temperature control means are provided which are responsive to the detected temperature.

In one preferred embodiment, multiple sensors are disposed at selected points throughout the field which transmit temperature information to a device which computes an average field temperature and a control device is provided which controls the temperature or flow rate of the temperature controlling fluid in response to the average field temperature, thereby minimizing the effect of localized temperature extremes in the field.

In another preferred embodiment, specially designed wedge-like coupling devices are employed to fluidly connect the large diameter tubular extensions to the supply and return headers with a leak resistant interference fit. The special couplings provide critical leak resistance while permitting the use of large diameter heat-exchanging tubes which reduces installation time, simplify plumbing and permit the use of complete circuits of substantially increased length without compromising heating or cooling evenness.

Other objects and advantages of the present invention will be more apparent from the following detailed description of preferred embodiments, when taken in conjunction with the drawings.

BRIEF DESCRIPTION OF THE DRAWINGS

FIG. 1 show an overall top view of an apparatus for controlling the temperature of a turf field constructed in accordance with the present invention;

FIG. 2 is a cross-sectional view of an apparatus for controlling the temperature of a turf field constructed and installed in accordance with a preferred embodiment of the present invention; and FIG. 3 is an enlarged scale side view of a header assembly in accordance with a preferred embodiment of the present invention;

DETAILED DESCRIPTION OF THE PREFERRED EMBODIMENT

Referring now to FIG. 1 and FIG. 2, a preferred embodiment of an apparatus for controlling the temperature of a turf field 10 in accordance with the present invention is shown having an array of hollow tubular heat-exchanging elements 12. The tubular heat-exchanging elements are manufactured from a flexible synthetic rubber such as EPDM which can withstand temperatures up to 250 degrees F. and exposure to adverse weather and ambient soil conditions. The diameter of the tubing is chosen such that individual circuits may reach lengths of 300 feet without substantial variation in heat exchange rate throughout the length of the circuit. Typically, a tubing with an outer diameter of $\frac{1}{2}''$ to $\frac{3}{4}''$ is employed. Each tubular element is fluidly connected to hollow supply header pipe 13 and hollow return header pipe 14 by means of individual coupling devices 15.

The coupling device 15 is specially designed to accommodate large diameter tubular elements with a leak resistant interference fit. The coupling device 15 is made from an elastomeric material such as Nylon 66 and exhibits two conical surface portions 25 having conical tip portions 26. One conical Nylon surface portion 25 engages the end of the heat exchanging tubular element 12 with an interference fit while the other conical surface portion 25 engages an opening 32 in rigid PVC header pipe 13 or 14 with an interference fit. Upon insertion of the coupling device 15 into the opening 32, conical tip portion 26 prevents the coupling device 15 from exiting header pipe 13 or 14.

Header pipes 13 and 14 are typically manufactured from sch. 80 PVC stock and cut to length depending on the shape of the subject turf field. Supply header pipe 13 is fluidly connected to fluid supply pipe 36 and return header pipe 14 is fluidly connected to fluid return pipe 21 by means of standard PVC fittings 37. The fluid supply and return pipes 36 and 21 are fluidly connected to a source of fluid 16 which supplies fluid to the system at a selected temperature and/or flow rate. The source of fluid 16 will generally be a pressurized combustion low-mass hydronic heating boiler such as those manufactured by Hamilton Engineering, Inc. of Garden City Mich. If it is necessary that temperature of the turf field be reduced, a pressurized source of chilled fluid, such as any of those well known in the prior art may be connected to the fluid supply pipe 36 and fluid return pipe 21. Fluid supply pipe 36 and fluid return pipe 21 are provided with an insulating surface layer, such as standard foam rubber insulation available in tubular or sheet form, to minimize energy loss during transmission of the temperature controlling fluid between the headers and the source of fluid 16.

Headers 13 and 14 are typically engineered to be located along the narrowest end of the turf field 11 and the array of tubular elements 12 is arranged in the general shape of the turf field 11 in which the system is being installed with individual circuits 12 being designed to be approximately equal in length (i.e. to within 10%).

The desired shape of the array of tubular elements is maintained by a series of tracks 19 consisting of an L-shaped extrusion displaying a plurality of side-by-side tube-receiving notches 20. The tracks permit the location of the heat-exchanging tubes 12 so as to balance the heat potential of the system to match the heat losses that occur in a higher degree near the perimeter of the turf field or in deeply shaded areas of the turf field. This ensures that all portions of the field will receive approximately the same amount of BTUH input. The track 19 is made from a high performance TPR or thermoplastic rubber which is capable of withstanding chemical, environmental, ultraviolet and temperature exposure typically encountered in such applications. The foot or base portion 23 of the track 19 has a groove for easy fastener location and a serrated base for easy adhesive attachment to a substrate.

The length of all tubular elements 12 is extended by means of segment 17 so as to permit location of the header pipes 13 and 14 outside the area of the turf field. Such location permits repair and maintenance of the headers without costly excavation and destruction of the turf field. The header pipes 13 and 14 are provided with a removable guard or shroud 33 which protects them from contact with soil or other subsurface media upon installation in the ultimate underground location of the header pipes. The portion of the tubular elements which extends from the edge of the turf field to the header pipes 13 and 14 is provided with an insulating layer 24 to minimize energy loss during transmission of the temperature controlling fluid between the header pipes and the turf field 10.

In order to provide an energy efficient temperature control system, individual temperature sensors 18 are disposed at various positions within or adjacent the turf field 10. Typically, four separate sensors would be disposed at diametrically opposed areas of the field. A control device 22 is employed to receive temperature data from the individual sensors and to compute an average field temperature. The control device controls the temperature of fluid in the fluid source 16 or the flow rate of fluid from the fluid source 16 in response to the average field temperature. The control device may be any of those of a type well known in the prior such as controllers manufactured by Tekmar Control Systems, Inc. The use of average field temperature to control the operation of the fluid source 16 substantially increases energy efficiency by reducing cycling of the fluid source due to spot irrigation or exposure of small spots on the field to sunlight which would cause a single sensor 18 to yield misleading temperature information about the overall field temperature.

In FIG. 2, an apparatus is shown in accordance with a preferred embodiment of the present invention as a subsurface installation in connection with a golfing green. After excavation of the site of the green 10, a layer of gravel 30 is deposited in the excavation. A drainage pipe 31 is positioned on the gravel and the pipe is covered with additional gravel thereby completing gravel layer 30. A thin "choker layer" of coarse sand 29 is deposited over the gravel layer and the heat-exchanging tubes 12 are positioned on the course sand. The tubes 12 are then covered with sand to complete the choker layer.

A thick layer of a soil root-zone mixture 28 is deposited over the choker layer which is then seeded with grass seed or sodded to produce the grass surface 27 of the turf field 1. The header pipes 13 and 14, together with guard 33 are installed beneath the surface at the skirt of the green, i.e. at a position laterally removed from the region covered by the grass layer 27., thereby providing for easy access to the header pipes 13 and 14 without excavation of the field.

FIG. 3 shows a side view of supply header pipe 13 exhibiting an automatic air vent 34. This supply header pipe is fluidly connected to a series of coupling devices 15 which, in turn, are fluidly connected to tubular heat-exchanging elements 12 (not visible from this view). A leak-resistant seal between the coupling device 15 and the header pipe is effected by means of the interference fit between conical surface portion 25 of coupling device 15 and the openings in the header pipe 13.

Although the invention has been described and illustrated in detail, it is intended to be clearly understood that the above is to be taken by way of illustration and example only and not by way of limitation. The spirit and scope of the invention are to be limited only by the terms of the appended claims.

What is claimed:

1. An apparatus for controlling temperature of a turf field overlying sub-surface media comprising:
    a supply header and a return header,
    an array of heat-exchanging tube means for disposition beneath said turf field,
    coupling means for connecting each of said tubes in fluid connection with said supply header and said return header, said coupling means including a resilient conical surface portion engageable with openings in each of said headers in an interference fit,
    fluid circulating means for circulating fluid through said tubes,
    header connecting means for connecting said supply header and said return header to said fluid circulating means,
    means for connecting said supply header and said return header in fluid communication with said heat-exchanging tube means at a location laterally disposed from said turf field,
    sensor means for sensing said temperature of said field,
    control means for maintaining said temperature within a predetermined range to facilitate growth of said field.

2. An apparatus according to claim 1, including header guard means disposed adjacent said headers for shielding said headers from said subsurface media.

3. An apparatus according to claim 1, wherein said control means comprises temperature control means for controlling a temperature exhibited by said fluid.

4. An apparatus according to claim 1, wherein said control means comprises flow control means for controlling a flow rate of said fluid through said heat-exchanging tube means.

5. An apparatus according to claim 1, including insulating means for insulating said means for connecting said supply header and said return header in fluid communication with said heat-exchanging tube means.

6. An apparatus according to claim 1, including track means for maintaining said heat-exchanging tube means in fixed relation to one another.

7. An apparatus according to claim 1, wherein said array exhibits an irregular surface area and each said heat-exchanging tube means exhibits a length, said length being substantially equal for each said tube means.

8. An apparatus according to claim 1, wherein said sensor means comprises a plurality of temperature sensors disposed at a plurality of locations throughout said field and computing means for computing an average temperature of said field from temperatures sensed at such locations, said control means being responsive to said average temperature.

9. A method of controlling temperature of a turf field overlying sub-surface media comprising:
    placing a supply header and a return header underground at a position laterally disposed from said turf field,
    placing an array of heat-exchanging tubes beneath said turf field,
    connecting each of said tubes in fluid connection with said supply header and said return header using connecting means having a conical wedge portion engageable with an opening in said headers in an interference fit,
    connecting said supply header and said return header to temperature-controlling fluid circulating means,
    sensing said temperature of said field, and
    circulating said temperature-controlling fluid through said heat-exchanging tubes in response to said temperature of said field to maintain said temperature within a specified range.

10. A method according to claim 9, wherein header guard means are disposed adjacent said headers for shielding said headers from said subsurface media.

11. A method according to claim 9, wherein a temperature of said temperature-controlling fluid is adjusted in response to said temperature of said field to maintain said temperature of said field within a specified range.

12. A method according to claim 9, wherein a flow rate of said temperature-controlling fluid is adjusted in response to said temperature of said field to maintain said temperature of said field within a specified range.

13. A method according to claim 9, wherein said heat-exchanging tubes are disposed in a track in fixed relation to one another.

14. A method according to claim 9, wherein said array exhibits an irregular surface area and each said tube exhibits a length, said length being substantially equal for each said tube.

15. A method according to claim 9, including sensing said temperature at a plurality of locations throughout said field, computing an average temperature of said field from temperatures sensed at such locations, and controlling said temperature of said field in response to said average temperature.

* * * * *